US009265271B2

(12) United States Patent
Greenberg

(10) Patent No.: US 9,265,271 B2
(45) Date of Patent: *Feb. 23, 2016

(54) METHOD FOR DECORATING A CAKE WITH A CAKE COATING

(71) Applicant: Rachel Greenberg, Gedera (IL)

(72) Inventor: Rachel Greenberg, Gedera (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/596,244

(22) Filed: Jan. 14, 2015

(65) Prior Publication Data

US 2015/0132453 A1 May 14, 2015

Related U.S. Application Data

(63) Continuation-in-part of application No. 12/597,536, filed on Oct. 26, 2009, now Pat. No. 8,968,810.

(51) Int. Cl.
*A23G 1/00* (2006.01)
*A23G 3/34* (2006.01)
*A21D 13/00* (2006.01)

(52) U.S. Cl.
CPC .......... *A23G 3/0097* (2013.01); *A21D 13/0016* (2013.01); *A21D 13/0087* (2013.01); *A23G 1/0063* (2013.01); *A23G 3/0091* (2013.01)

(58) Field of Classification Search
CPC ........... A21D 13/0016; A21D 13/0009; A21D 13/0087
See application file for complete search history.

(56) References Cited

U.S. PATENT DOCUMENTS 4,480,974 A * 11/1984 Akutagawa ............ A23G 1/205
425/112
2003/0215554 A1* 11/2003 McCarrick ......... A21D 13/0009
426/549
2006/0172042 A1* 8/2006 Clemons ................ A23B 7/154
426/103
2006/0182856 A1* 8/2006 Ornelaz, Jr. .......... A23G 1/0063
426/383

FOREIGN PATENT DOCUMENTS

JP   59120051   *  7/1984
JP   59130137   *  7/1984

OTHER PUBLICATIONS

Google Groups, Hallow Chocolate Balls, Nov. 2001.*
Chocolate Candy Mall, Jan. 2012.*
Internet Archive, Sugarcraft Dec. 2005 r http://www.sugarcraft.com/catalog/airbrush/kopyjetmolds.htm.*
(Continued)

*Primary Examiner* — Rena L Dye
*Assistant Examiner* — Lela S Williams
(74) *Attorney, Agent, or Firm* — Edward Langer, Adv. & Patent Attorney

(57) ABSTRACT

A method for decorating a cake: providing a solid edible figure contour having an open top face and an open bottom face, and at least one void; providing a solid edible frame; placing the contour and the frame on a pan; filling the at least one void of the solid edible figure contour and a void between the solid frame and the solid edible figure contour with a decorative layer of edible pourable substance comprising multiple colors of candies, and the like; pouring a solidifying binding edible substance onto the solid contour, frame and the decorative layer; turning the hardened solid coating upside down, such that the lid is under the hardened solid coating; and placing the hardened solid coating having the colorful figure on a cake by sliding the figure off of the lid and removing the pan, thereby providing a cake coating having an edible colorful figure.

9 Claims, 9 Drawing Sheets

(56) References Cited

OTHER PUBLICATIONS

Chocolate Making (http://web.archive.Org/web/20070107175314/http://chocomap.com/chocolate-making-molds.php). 2007.*
http://chowhound.chow.com/topics/276889. 2006.*
(http://www.slashfood.com/2006/07/28/food-porn-chocolate-truffle-layer-cake/). 2006.*
The Eyes Have It (http://eyes-have.blogspot.com/2006/07/praline-truffle-or-just-plain.html). 2006.*

* cited by examiner

METHOD FOR DECORATING A CAKE WITH A CAKE COATING

FIELD OF THE INVENTION

The present invention relates to the field of cake preparation. More particularly, the invention relates to a method for preparing a decorative cake coating which provides figures of a relatively-high quality.

BACKGROUND OF THE INVENTION

Decorating a cake to reflect personal touch and taste is a well known objective. For example, birthday cakes may be adorned with fruits, shaved chocolate, candles, and so forth. The text "Happy Birthday" may be added by a pre-manufactured plastic decoration, pouring chocolate, candies, and so on.

Nevertheless, there is no satisfactory technology for decorating a cake with figures such as of animals, text, etc.

It is an object of the present invention to provide a technology for decorating a cake with figures, and a method thereof.

Other objects and advantages of the invention will become apparent as the description proceeds.

SUMMARY OF THE INVENTION

The following embodiments and aspects thereof are described and illustrated in conjunction with systems, tools and methods, which are meant to be merely illustrative, not limiting in scope. In various embodiments, one or more of the above-described problems have been reduced or eliminated, while other embodiments are directed to other advantages or improvements.

In one aspect, the present invention is directed to a method for decorating a cake with a cake coating, wherein the method comprises the steps of:
  providing a solid edible figure contour having an open top face and an open bottom face, wherein the solid edible figure contour defines at least one void;
  providing a solid edible frame;
  placing the solid edible figure contour and the solid edible frame on a pan;
  filling the at least one void of the solid edible figure contour and a void between the solid frame and the solid edible figure contour with a decorative layer of edible pourable substance comprising multiple colors of candies, and the like, thus forming a colorful figure;
  pouring a solidifying binding edible substance onto the solid edible figure contour, the solid edible frame and onto the layer of decorative edible substance, wherein the solidifying binding edible substance is allowed to form a hardened solid layer covering the solid edible figure contour, the solid frame and the layer of decorative edible substance and gaps there between, thereby producing a hardened solid coating comprising the decorative and solidifying binding edible substance;
  placing a lid on top of the hardened solid coating;
  turning the hardened solid coating that has been placed on the lid upside down, such that the lid is under the hardened solid coating, and wherein the colorful figure is thereby revealed showing the solid edible figure contour as the outline of the colorful figure; and
  placing the hardened solid coating having the colorful figure on a cake by sliding the figure off of the lid and removing the pan, thereby providing a cake coating having an edible colorful figure.

Preferably, the solid edible figure contour comprises chocolate.

Preferably, the solidifying binding edible pourable substance comprises chocolate.

The height of the frame is preferably between about 5 mm and 7 mm.

The method may comprise a further step of placing a grease layer between the contour and a pan thereof, wherein the grease layer may be of grease-proof paper, margarine, and the like.

The solidifying binding edible substance solidifies at room temperature or at refrigerator temperature.

According to one embodiment of the invention, the solid edible figure contour's height is equal or greater than about 2 mm.

Preferably, the solid edible frame is higher than the solid edible figure.

In addition to the exemplary aspects and embodiments described above, further aspects and embodiments will become apparent by reference to the figures and by study of the following detailed description.

BRIEF DESCRIPTION OF THE DRAWINGS

The objects and features of the present invention will become apparent from the following detailed description considered in conjunction with the accompanying drawings, in which.

Each of FIGS. 4a to 4h schematically illustrates a step in cake preparation, according to one embodiment of the invention.

Figure 5A:
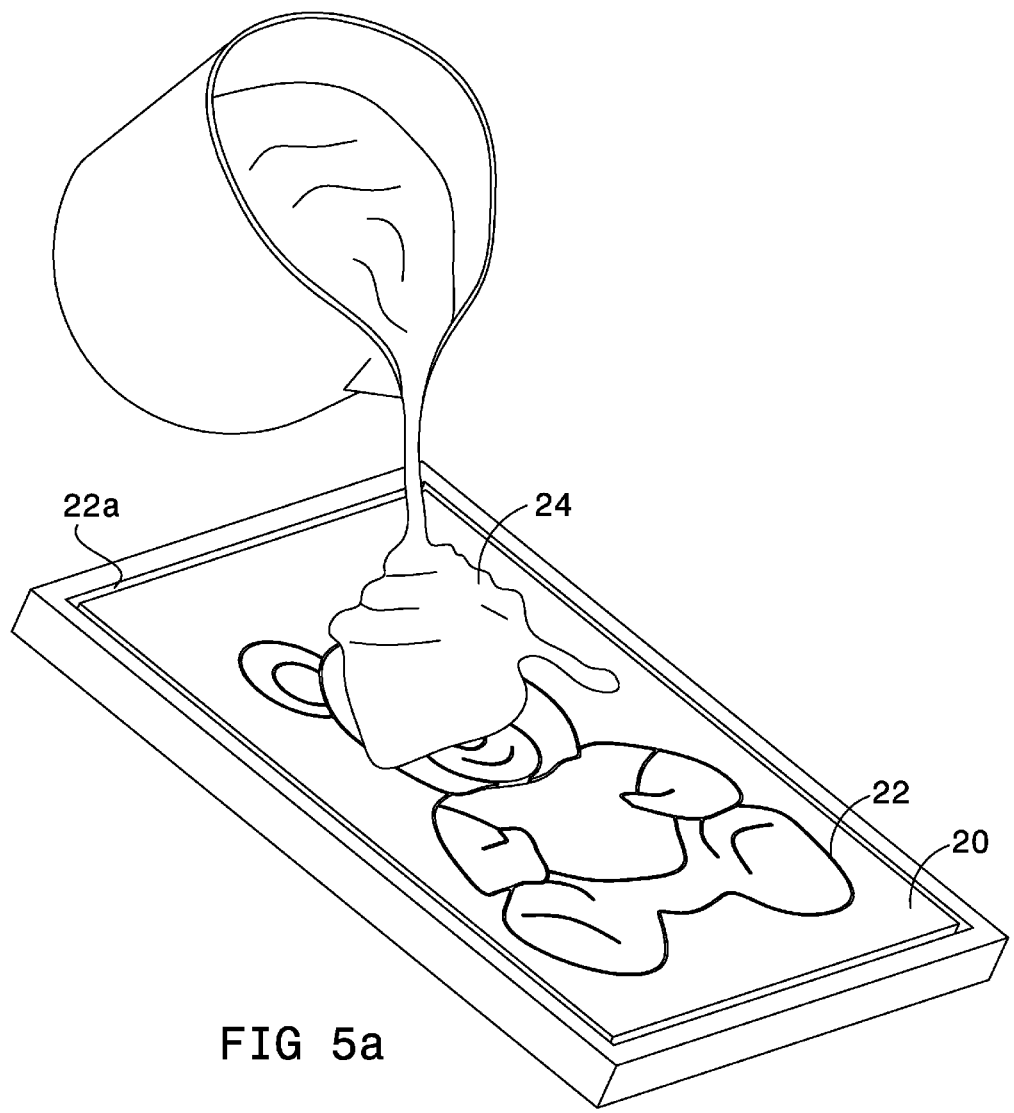
Figure 5B:
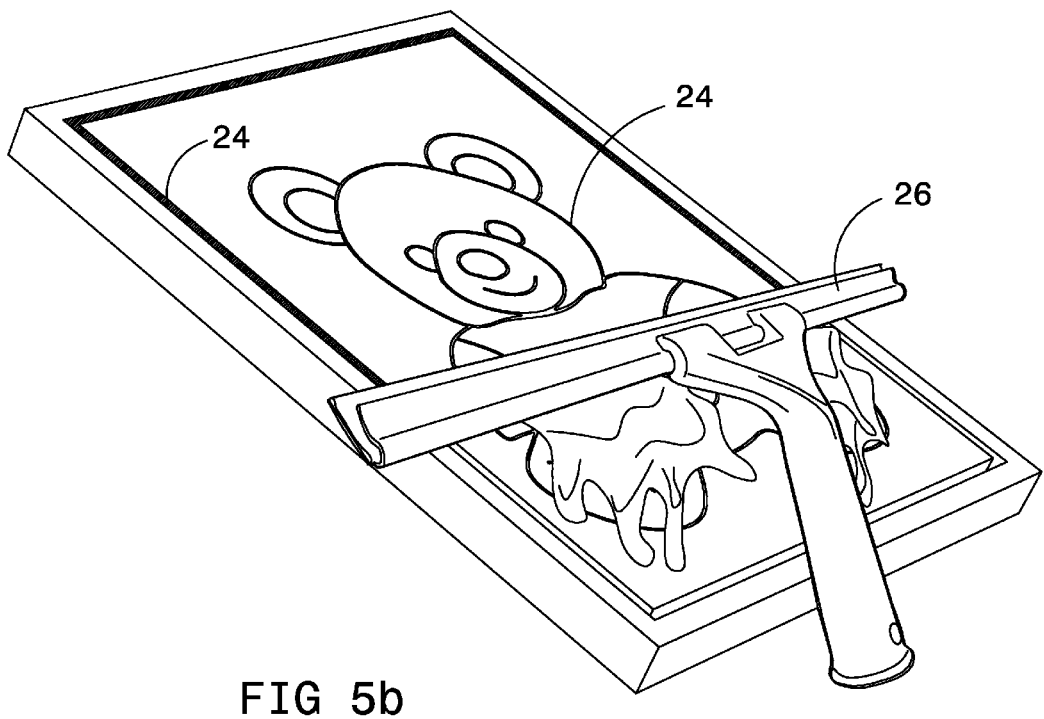
Figure 5C:
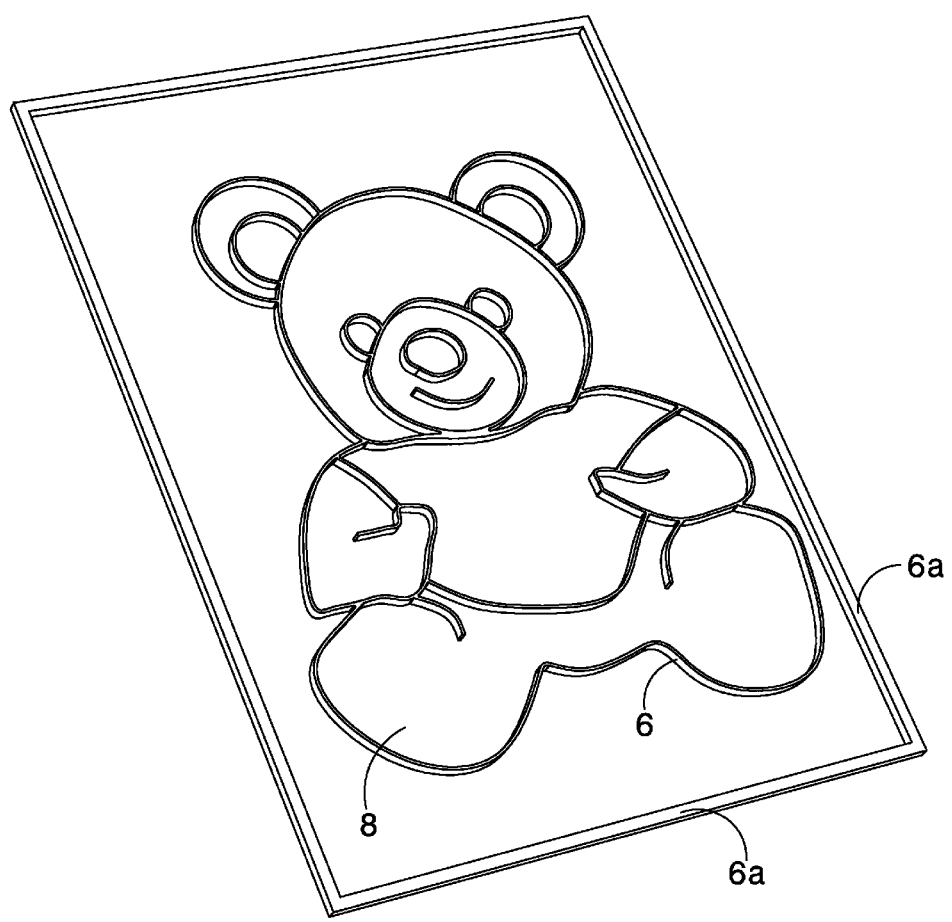

Each of FIGS. 5a to 5c schematically illustrates a step in preparing a contour of solid chocolate, according to one embodiment of the invention.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein. Reference numerals may be repeated among the figures in order to indicate corresponding or analogous elements.

DETAILED DESCRIPTION OF PREFERRED EMBODIMENTS

In the following detailed description, numerous specific details are set forth in order to provide a thorough understanding of the invention. However, it will be understood by those skilled in the art that the present invention may be practiced without these specific details. In some instances, well-known methods, procedures, components and circuits have not been described in detail, for the sake of clarity.

Figure 1:
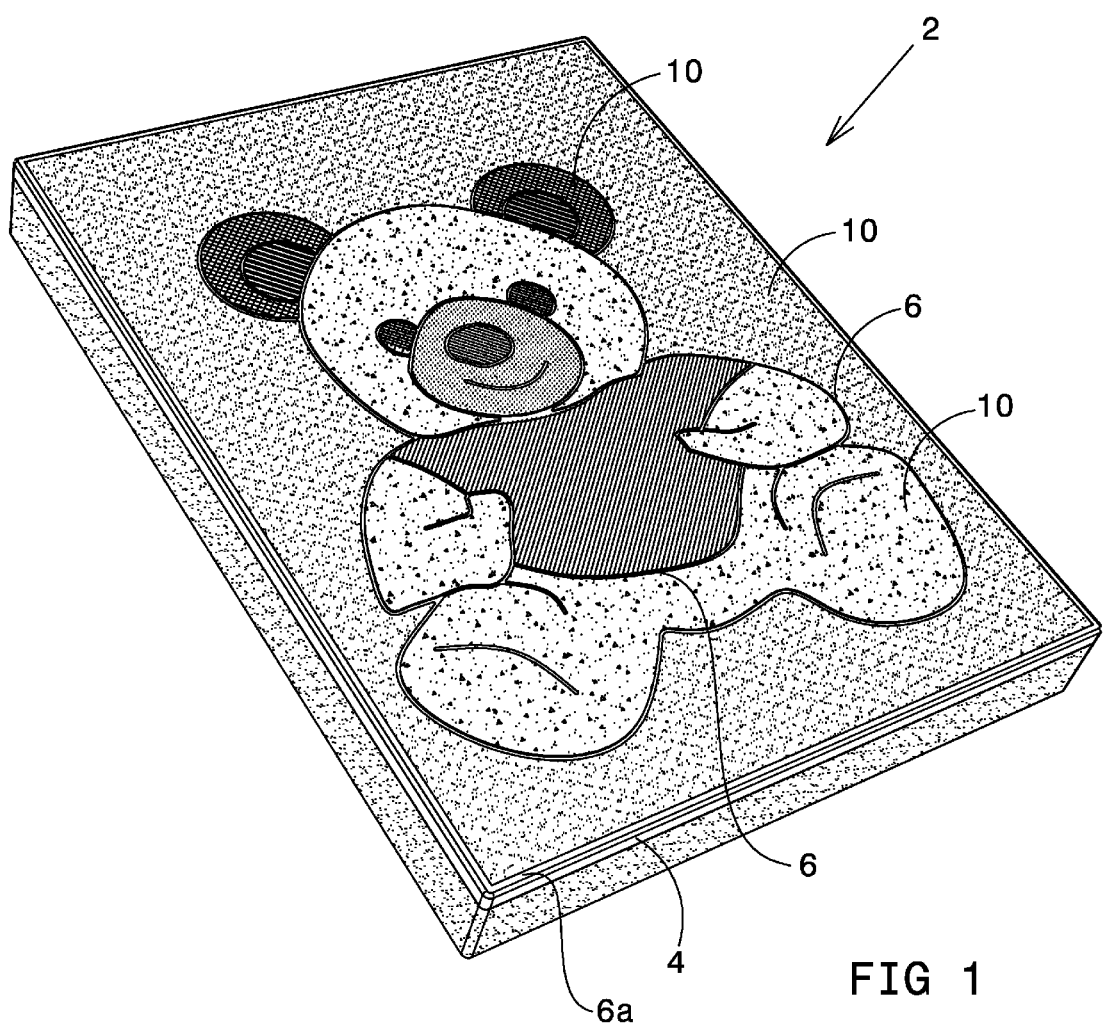
FIG. 1 schematically illustrates a cake, according to one embodiment of the invention.

FIG. 1 schematically illustrates a cake, according to one embodiment of the invention.

The cake, which is marked herein by numeral 2, comprises the figure of a bear. The figure is composed of voids (closed regions) 8 (illustrated in FIG. 2), whose contour 6 is made of solid chocolate. One of the objects of the present invention is preparing chocolate contour 6, especially in an industrial manner. Numeral 6a denotes a chocolate frame, which is actually a part of the chocolate contour 6.

Each void 8 can be filled with a different substance 10, different color of the substance, and so on, resulting in differing colors and flavors. The substance 10 may comprise candies of relatively-small size (e.g., 0.3 mm), cream, ice cream, and so on. For example, the substance filling in the bear's eyes may be blue, for the bear's nose may be black, the bear's shirt may be green, the legs brown, and so on.

Also illustrated in FIG. 1 is a pan 4.

Figure 2:
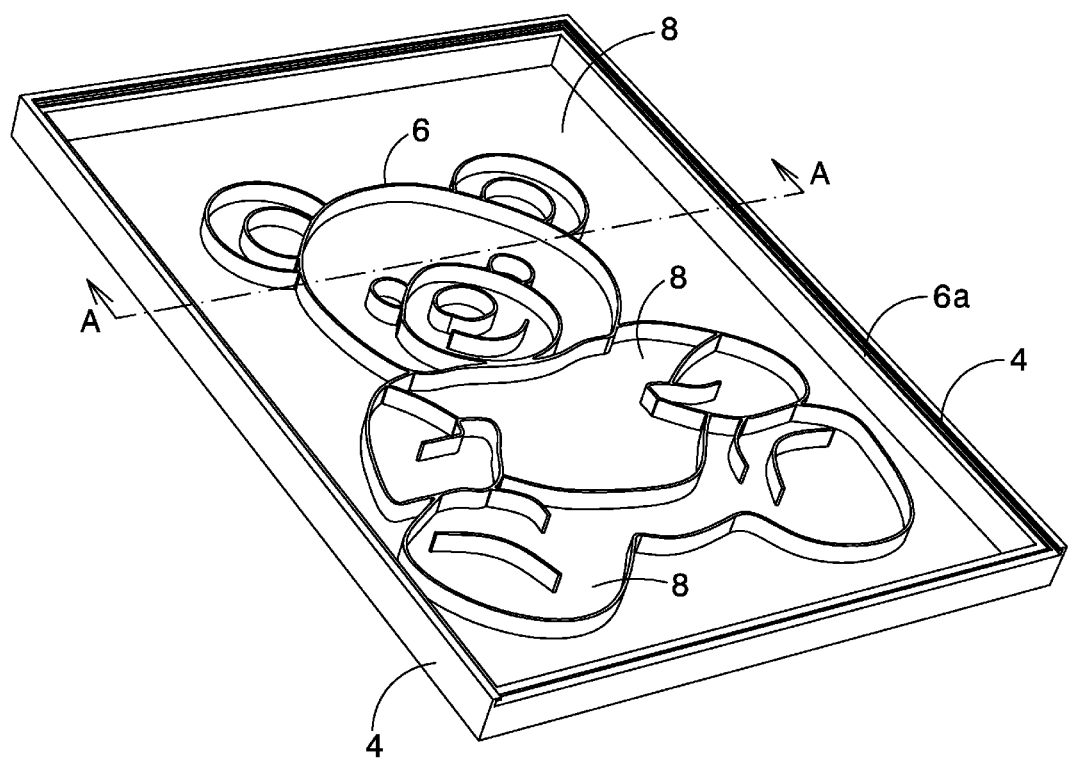
FIG. 2 schematically illustrates a chocolate contour, according to one embodiment of the invention.
Figure 3:
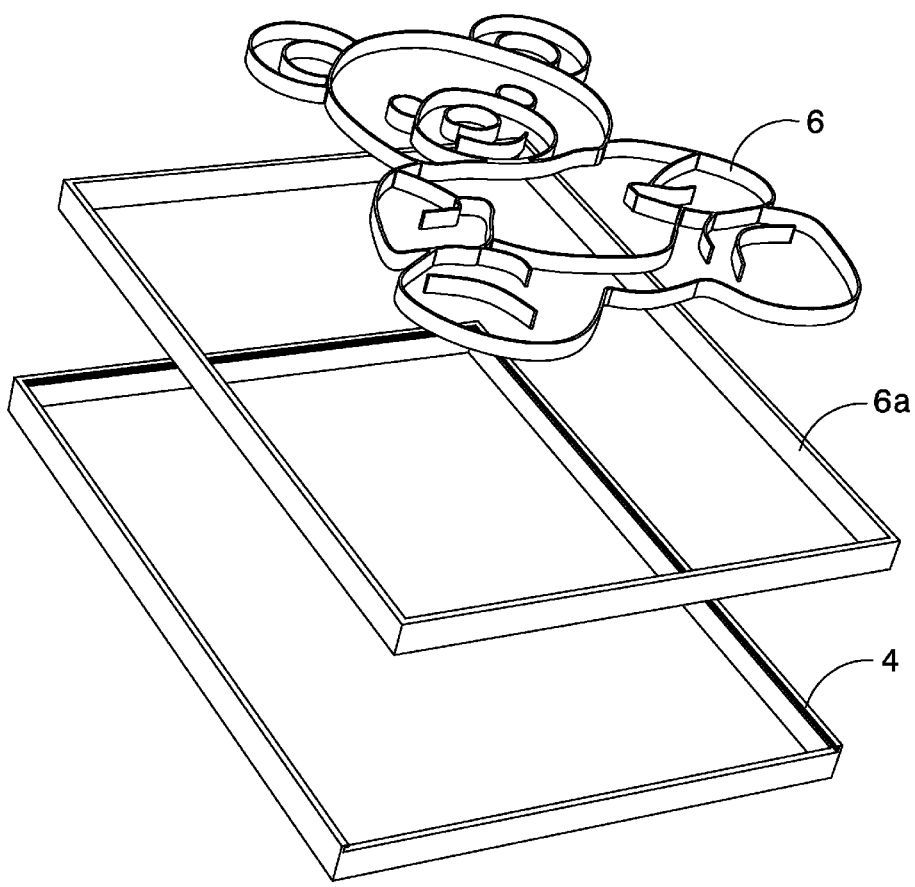
FIG. 3 is an exploded view of the contour illustrated in FIG. 2.

FIG. 2 schematically illustrates a chocolate contour, according to one embodiment of the invention, and FIG. 3 is an exploded view thereof.

The chocolate contour 6 is of a height of a few mm, e.g., 3 mm.

Also defined in FIG. 2 is a cross-section A-A.

Each of FIGS. 4a to 4g schematically illustrates a step in cake preparation, according to one embodiment of the invention. The illustrations are in the form of a cross-section of the cake, as defined in FIG. 2. Reference numeral 28 denotes a space in which a lid 14 is to be placed. Reference numeral 29 (see FIG. 4a) denotes a hooked edge which holds the lid 14 (seen in FIG. 4d).

Figure 4A:
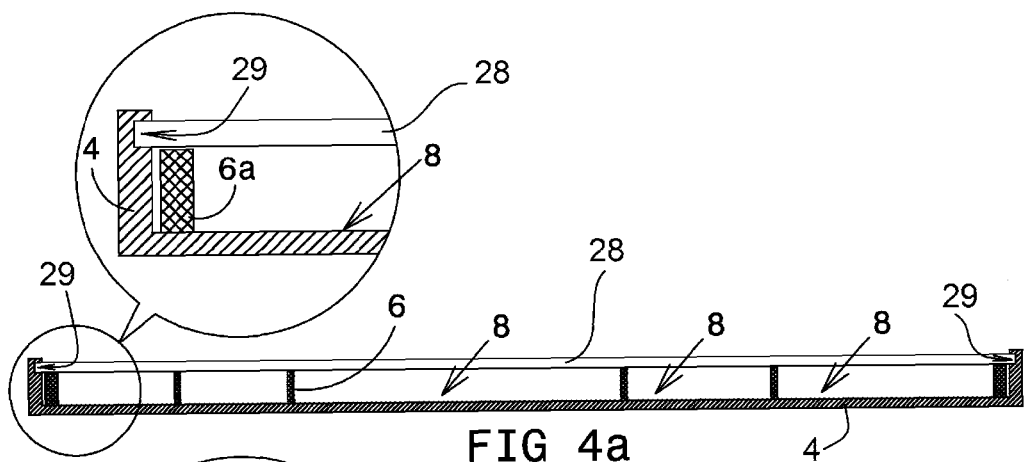
Figure 4B:
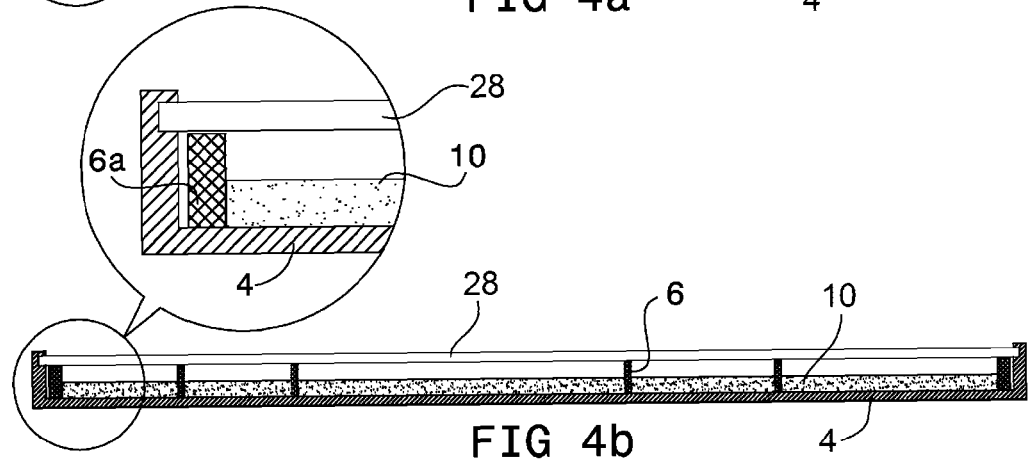
Figure 4C:
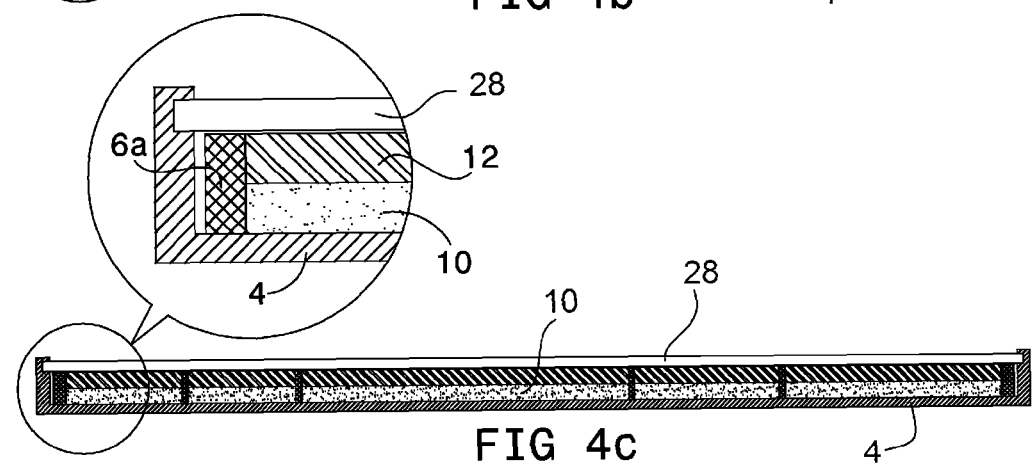

FIGS. 4a to 4c schematically illustrate the steps of preparing a decorative coating, denoted herein by numeral 16. FIGS. 4f to 4g schematically illustrate the steps of placing the decorative coating 16 on a baked substrate 18.

FIG. 4a schematically illustrates the pan 4, in which chocolate contour 6 (and also chocolate frame 6a) is placed.

FIG. 4b schematically illustrates the next step of the cake preparation. In this step, voids 8, confined by chocolate contour 6, are filled with candies 10.

FIG. 4c schematically illustrates the next step of the cake preparation. In this step, hot chocolate dough 12 (as an example of solidifying binding edible substance) is poured on the candies filler 10. The hot chocolate pours into the gaps between candies, at least on the upper side of the candies layer. After the hot chocolate cools, it becomes a solid layer. The solid chocolate layer is marked herein by numeral 12a. As mentioned, the entire decorative coating is marked herein by numeral 16 (seen in FIGS. 4e and 4f).

Figure 4D:
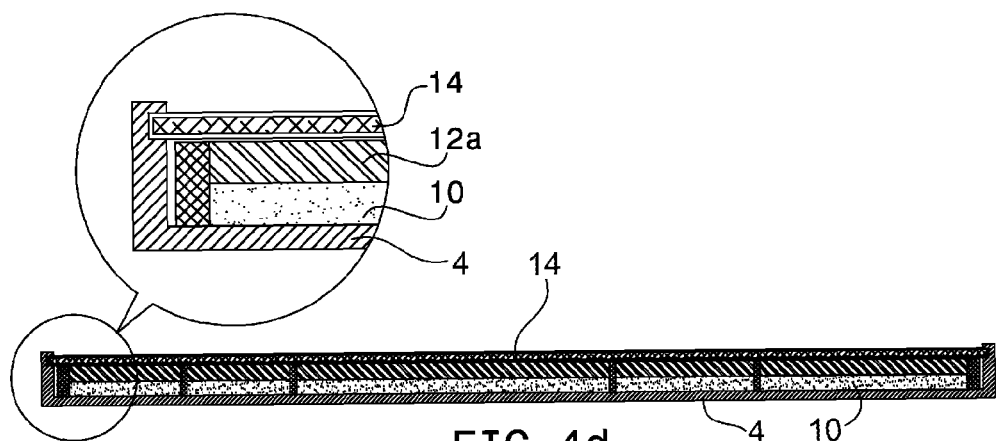

FIG. 4d schematically illustrates the next step of the cake preparation. In this step, pan 4 is covered with lid 14, which makes it possible to turn the pan upside down without disturbing the parts thereof. Lid 14 is held by the hooked edge 29 (seen in FIG. 4a).

Figure 4E:
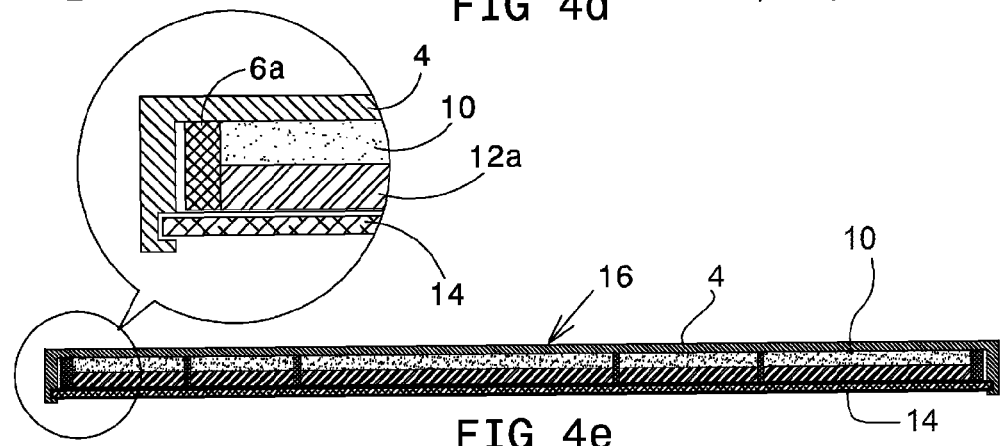
Figure 4F:
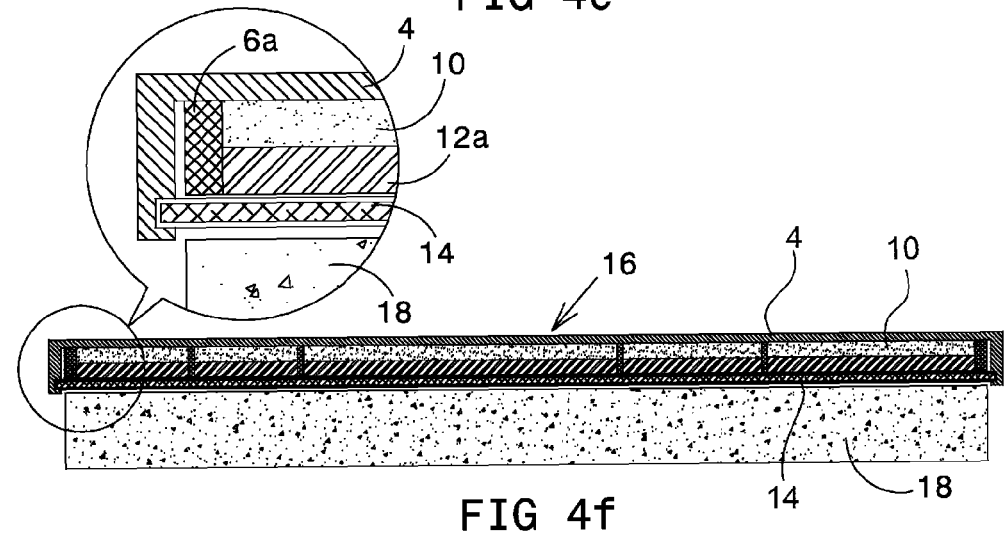
Figure 4G:
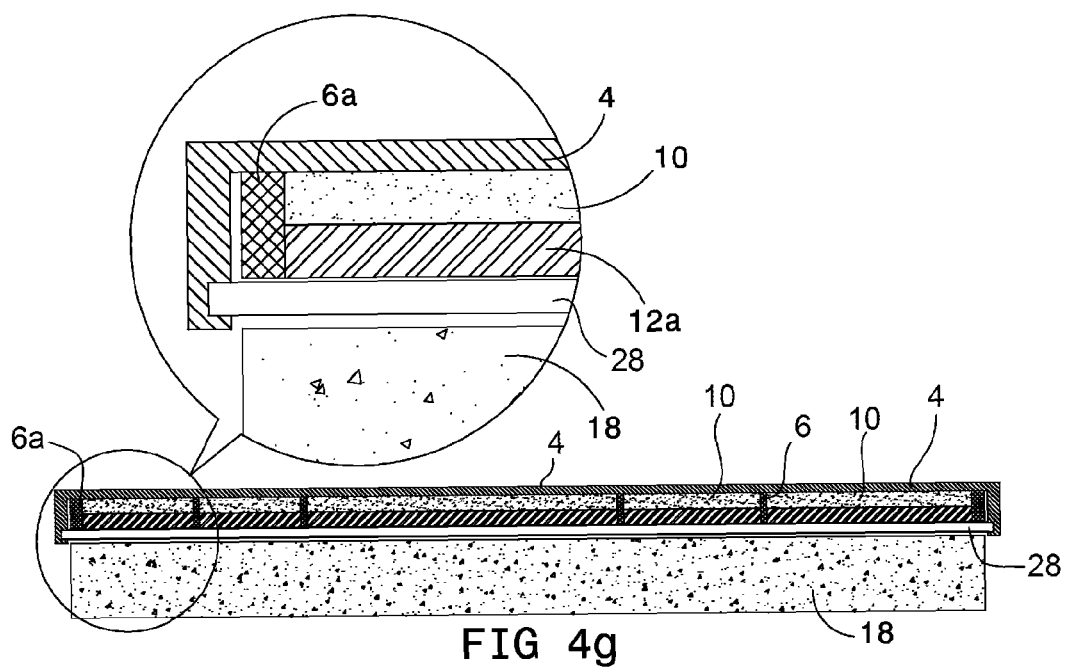

FIG. 4e schematically illustrates the next step of the cake preparation. In this step, pan 4 is turned upside down. In this position, as illustrated in this figure, the bottom of coating 16 is the hardened layer 12a, while the candies are actually deployed at the top of coating 16.

FIG. 4f schematically illustrates the next step of the cake preparation. In this step, pan 4, which stores the prepared coating 16, is placed on a baked substrate 18.

FIG. 4g schematically illustrates the next step of the cake preparation. In this step, lid 14 is removed from pan 4, thereby causing coating 16 to fall onto the cake.

Figure 4H:
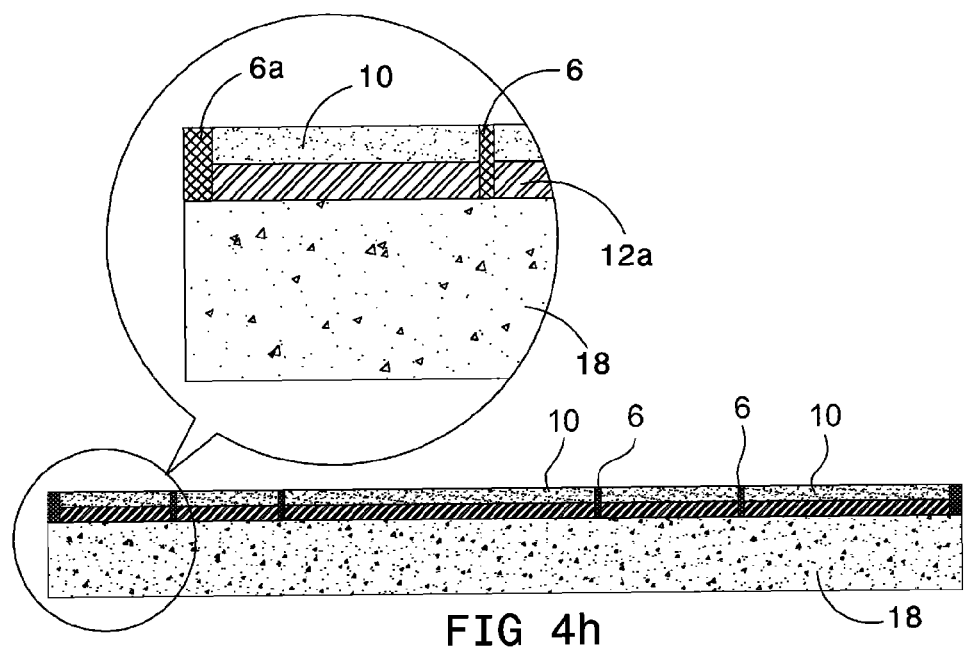

FIG. 4h schematically illustrates the next step of the cake preparation. In this step, pan 4 is removed, thereby bringing the preparation to its end.

Each of FIGS. 5a to 5c schematically illustrates a step in preparing a contour of solid chocolate, according to one embodiment of the invention.

The preparation of the contour is suitable for both industrial and domestic use.

According to this embodiment of the invention, the chocolate contour, marked in the figures herein by numeral 6, is prepared using a mould 20 comprising slots 22, which correspond to the negative image of the contour. The mould is made of non-toxic material, such as foamed plastic.

In FIG. 5a, chocolate dough 24 (which may be also hot chocolate) is poured on mould 20, thereby filling slots 22 with the chocolate dough.

In FIG. 5b, the excess of chocolate dough 24 is "wiped" using a wiper (squeegee) 26. Then the mould is cooled, thereby causing chocolate dough 24 to harden in slots 22.

In FIG. 5c, mould parts are removed, resulting in a chocolate contour 6 (including the chocolate frame 6a), ready for coating preparation, as illustrated and explained in FIGS. 1 to 4h.

The whole process may be carried out using a pan. However, for the sake of brevity, the pan is not illustrated in FIGS. 5a to 5c.

The examples herein refer to a chocolate contour. However, it should be noted that the contour can be of any edible substance which has a fluid state of aggregation and a solid state of aggregation, wherein the solidification takes place at room temperature, placing in a refrigerator, and the like.

GREASING

Since the cake coating may stick to the pan, greasing means such as a grease-proof paper, a grease layer, and the like may be used for preventing the sticking. For example, a grease-proof paper may be disposed between pan 4 and the chocolate contour 6. Alternatively, the pan may be smeared with a greasy substance (such as margarine) before placing the chocolate contour thereon.

A grease layer may be used also for allowing separation of the chocolate contour 6 from mould 20 in an easy manner. In this case, before filling slot 22 with hot chocolate, the slot has to be smeared with a grease layer.

PARTS LIST

In the drawings and/or description herein, the following numerals have been mentioned:

numeral 2 denotes a cake, according to one embodiment of the invention;
numeral 4 denotes a pan, such as a baking pan;
numeral 6 denotes a contour of hardened chocolate;
numeral 6a denotes a chocolate frame;
numeral 8 denotes a void, i.e., a closed region, confined by chocolate contour 6;
numeral 10 denotes a decorative layer of edible pourable substance comprising multiple colors of candies;
numeral 12 denotes chocolate dough, as an example of solidifying binding edible substance;
numeral 12a denotes a filling chocolate, as an example of a solidified binding edible substance;
numeral 14 denotes the lid of pan 4;
numeral 16 denotes a cake coating, according to one embodiment of the invention;
numeral 18 denotes a baked substrate;
numeral 20 denotes a mould for preparing a chocolate contour;
numeral 22 denotes a slot corresponding to the contour of the figure;
numeral 22a denotes a slot corresponding to the contour of the frame;
numeral 24 denotes chocolate dough;
numeral 26 denotes a wiper (squeegee);

numeral 28 denotes a space in which a lid 14 is to be placed; and numeral 29 denotes a hooked edge which holds the lid (seen in FIG. 4*d*).

While certain features of the invention have been illustrated and described herein, the invention can be embodied in other forms, ways, modifications, substitutions, changes, equivalents, and so forth. The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

I claim:

1. A method for decorating a cake with a cake coating, wherein the method comprises the steps of:
    providing a solid edible figure contour having an open top face and an open bottom face, wherein said solid edible figure contour defines at least one void;
    providing a solid edible frame;
    placing said solid edible figure contour and said solid edible frame on a pan;
    filling said at least one void of said solid edible figure contour and a void between said solid frame and said solid edible figure contour with a decorative layer of edible pourable substance comprising multiple colors of candies and the like, thus forming a colorful figure;
    pouring a solidifying binding edible substance onto said solid edible figure contour, said solid edible frame and onto said layer of decorative edible substance, wherein the solidifying binding edible substance is allowed to form a hardened solid layer covering said solid edible figure contour, said solid frame and said layer of decorative edible substance and gaps there between, thereby producing a hardened solid coating comprising said decorative and solidifying binding edible substance;
    placing a lid on top of the hardened solid coating;
    turning said hardened solid coating that has been placed on the lid upside down such that said lid is under said hardened solid coating, and wherein said colorful figure is thereby revealed showing said solid edible figure contour as the outline of said colorful figure; and
    placing said hardened solid coating having said colorful figure on a cake by sliding said figure off of said lid and removing said pan, thereby providing a cake coating having an edible colorful figure.

2. The method of claim 1, wherein said solid edible figure contour comprises chocolate.

3. The method of claim 1, wherein said solidifying binding edible pourable substance comprises chocolate.

4. The method of claim 1, wherein said frame's height is between about 5 mm and 7 mm.

5. The method of claim 1, further comprising placing a grease layer between said contour and said pan thereof.

6. The method of claim 4, wherein said grease layer is selected from a group consisting: a grease-proof paper and margarine.

7. The method of claim 1, wherein said solidifying binding edible substance solidifies at room temperature or at refrigerator temperature.

8. The method of claim 1, wherein said solid edible figure contour's height is equal or greater than 2 mm.

9. The method of claim 1, wherein said solid edible frame is higher than said solid edible figure.

\* \* \* \* \*